United States Patent [19]
Shimizu et al.

[11] Patent Number: 5,085,799
[45] Date of Patent: Feb. 4, 1992

[54] LIQUID CRYSTAL COMPOSITION

[75] Inventors: Itsuo Shimizu, Chiba; Kenji Furukawa, Kanagawa; Masami Tanaka, Chiba, all of Japan

[73] Assignee: Chisso Corporation, Japan

[21] Appl. No.: 392,965

[22] PCT Filed: Dec. 7, 1988

[86] PCT No.: PCT/JP88/01229
§ 371 Date: Aug. 4, 1989
§ 102(e) Date: Aug. 4, 1989

[87] PCT Pub. No.: WO89/05337
PCT Pub. Date: Jun. 15, 1989

[30] Foreign Application Priority Data
Jul. 12, 1987 [JP] Japan .................. 62-308898

[51] Int. Cl.$^5$ .................. C09K 19/12; C09K 19/52; C09K 19/06
[52] U.S. Cl. .................. 252/299.66; 252/299.01; 252/299.6
[58] Field of Search ............ 252/299.01, 299.6, 299.66

[56] References Cited
U.S. PATENT DOCUMENTS

| | | | |
|---|---|---|---|
| 3,947,375 | 3/1976 | Gray et al. | 252/299.66 |
| 3,952,046 | 4/1976 | Scherrer et al. | 252/299.66 X |
| 3,974,087 | 8/1976 | Gray et al. | 252/299.66 X |
| 4,048,089 | 9/1977 | Arai et al. | 252/299.66 |
| 4,053,451 | 10/1977 | Scherrer et al. | 252/299.66 |
| 4,112,239 | 9/1978 | Dubois et al. | 252/299.66 X |
| 4,253,740 | 3/1981 | Raynes et al. | 252/299.66 X |
| 4,328,116 | 5/1982 | Harrison et al. | 252/299.66 X |
| 4,374,748 | 2/1983 | Inukai et al. | 252/299.66 |
| 4,462,924 | 7/1984 | Raynes | 252/299.66 X |
| 4,820,444 | 4/1989 | Inukai et al. | 252/299.66 X |

FOREIGN PATENT DOCUMENTS

| | | | |
|---|---|---|---|
| 52-16488 | 2/1977 | Japan | 252/299.66 |
| 59-122574 | 7/1984 | Japan | 252/299.66 |
| 60-144383 | 7/1985 | Japan | 252/299.66 |
| 60-252686 | 12/1985 | Japan | 252/299.66 |
| 61-268790 | 11/1986 | Japan | 252/299.66 |

Primary Examiner—Robert L. Stoll
Assistant Examiner—C. Harris
Attorney, Agent, or Firm—Leydig, Voit & Mayer

[57] ABSTRACT

The present invention relates to a liquid crystal composition for use in thermal writing type liquid crystal displays in which a thermooptical effect is utilized. A technical subject of the present invention is to provide a liquid crystal composition characteristically having an extremely narrow nematic range and a low-melting phase transition point, and another object of the present case is to provide a liquid crystal display element using this composition.

The present invention is directed to a liquid crystal composition which comprises a component A comprising at least one of 4-n-alkyl-4'-cyanobiphenyls represented by the formula (1)

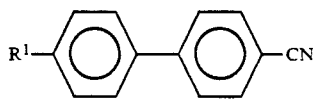

wherein $R^1$ is an alkyl group having 8, 9, 10, 11 or 12 carbon atoms, and a component B comprising at least one of 4-n-alkoxycarbonyloxy-4'-cyanobiphenyls represented by the formula (2)

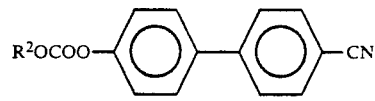

wherein $R^2$ is an alkyl group having 8, 9, 10, 11 or 12 carbon atoms, a ratio of the component A to the component B being from 25:75 to 95:5.

Since the liquid crystal composition of the present invention has a nematic range of 2° C. or less, the writing velocity of the display element is accelerated, and the contrast on a projection screen is bettered, whereby display quality is improved remarkably. Additionally, since having a melting point of 0° C. or less, the liquid crystal composition of the present inventin can be used in thermal writing type liquid crystal displays without any problems which can be utilized indoors and at room temperature.

13 Claims, No Drawings

LIQUID CRYSTAL COMPOSITION

TECHNICAL FIELD

The present invention relates to a liquid crystal composition for use in thermal writing type liquid crystal display devices utilizing a thermooptical effect, and this liquid crystal composition is characterized by having an extremely narrow nematic phase temperature range and a low-melting smectic phase.

BACKGROUND TECHNIQUE

In recent years, the advancement of liquid crystal display elements is remarkable, and most of these display elements are concerned with the application of nematic liquid crystals. On the other hand, other liquid crystal displays of different operation modes, in which characteristics of the other liquid crystal phase are utilized, have been intensively researched with the intention of putting these liquid crystal displays into practice, and as one kind of these other liquid crystal displays, there is a thermal writing projection device utilizing a thermal optical effect of a smectic A phase. The system of such a thermal writing projection device can provide the display of a larger area and a higher information capacity, both in the order, as compared with a conventional TN mode (twisted nematic mode).

Characteristics required for the liquid crystal materials used in this field are as follows:

(1) A wide smectic A phase range should be present (preferably, the smectic A phase should exist even at a temperature of 0 to $-20°$ C. or less).
(2) A nematic phase range should be extremely narrow.
(3) Birefringence should be large.
(4) Specific heat and phase transition energy should be small.
(5) Dielectric anisotropy value should be large.

Of these requirements, the paragraphs (1), (2) and (3) are considered to be important for the sake of the improvement of display performance such as the contrast on a projection screen. The liquid crystal material having the above-mentioned characteristics has not been found in the form of a single compound at present, and hence each mixture of various liquid crystal compounds is now investigated. Examples of these liquid crystal compounds can be represented by the following general formulae:

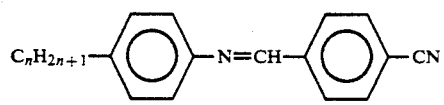

(I)

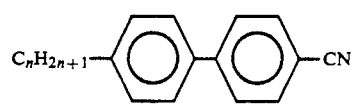

(II)

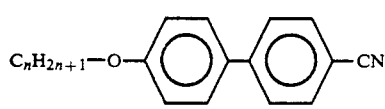

(III)

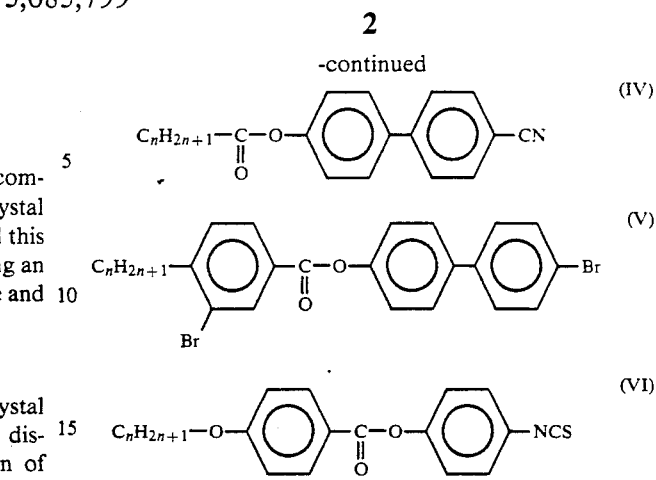

Furthermore, exemplary compositions of these compounds are set forth in Table 1.

TABLE 1

| Composition | Compounds | mp (°C.) | SN (°C.) | NI (°C.) | NR (°C.) |
|---|---|---|---|---|---|
| a | $I_8$, $I_{10}$, $I_{15}$ | 24 | 73.5 | 74 | 0.5 |
| b | $II_8$, $II_{10}$ | 12 | 37 | 42 | 5 |
| c | $II_8$, $II_{10}$, $V_8$ | 6 | 53 | 56 | 3 |
| d | $II_8$, $II_{10}$, $IV_9$ | 8 | 41.5 | 47 | 5.5 |
| e | $II_8$, $III_{10}$, $IV_9$ | $-30$ | 46.8 | 51.0 | 3.2 |
| f | $II_8$, $II_{10}$, $III_{10}$, $III_{12}$, $IV_9$, $VI_8$ | $-32.7$ | 54.7 | 57.3 | 2.6 |

In Table 1, the respective abbreviations have the following meanings:
mp: Melting point (°C.)
SN: Smectic/nematic transition point (°C.)
NI: Nematic/isotropic transition point (°C.)
NR: Nematic range (°C.) (=NI (°C.) - SN (°C.)]

In the column of "Compound" in the table, for example, $I_8$ means the compound of n=8 of Formula (I) mentioned above.

With regard to the composition a, the nematic range is as extremely narrow as 0.5° C., but the melting point is high, 24° C., which is in the vicinity of room temperature. Therefore, this compound is not practical, though it seems to be usable in experiments. On the other hand, with regard to the compositions e and f, the melting points are low, $-30°$ C. and $-32.7°$ C., respectively, but the nematic ranges are wide, 3.2° C. and 2.6° C., respectively. In consequence, these compositions are not satisfactory.

The nematic range is a factor which has an influence on the writing velocity and the display contrast of the display elements, and when the nematic range is wide, the writing velocity is low and the contrast also is poor. That is, when thermal writing is carried out under conditions of the wide nematic range, a long cooling time is required in the nematic phase in the step of forming an opaque smectic phase from an isotropic liquid via a nematic phase, which causes the writing velocity to delay. On the other hand, when the nematic phase state remains for a long period of time, the liquid crystal is oriented by a substrate which has been subjected to an orientation treatment (vertical orientation or homogeneous orientation), so that the scattered smectic A phase cannot be obtained, which causes the contrast to deteriorate.

With regard to the melting point, if it is 0° C. or less, the composition having such a melting point can be used in its usual applications. However, when it is intended to introduce long-term memory properties into a liquid crystal element, the melting point of 0° C. or so is insufficient and thus a lower melting point is demanded.

In addition to the above-mentioned compositions, the other thermal writing liquid crystal compositions are disclosed in Japanese Patent Laid-open Publication Nos. 144383/1985, 252686/1985 and 268790/1986, but the compositions having a nematic range of 2° C. or less and a melting point of 0° C. or less simultaneously cannot be found anywhere.

An object of the present invention is to provide a liquid crystal composition for thermal writing liquid crystal elements, more specifically, a liquid crystal composition having an extremely narrow nematic range and a low-melting phase transition point, and more particularly the present invention is to provide liquid crystal elements using the aforesaid composition.

DISCLOSURE OF THE INVENTION

The inventors of the present application have intensively conducted research so as to solve the above-mentioned conventional technical problems, and they have succeeded in obtaining a liquid crystal composition having a nematic range of 2° C. or less and a melting point of 0° C. or less.

A first feature of the present invention is directed to 1) a liquid crystal composition which comprises a component A comprising at least one of 4-n-alkyl-4'-cyanobiphenyls represented by the formula (1)

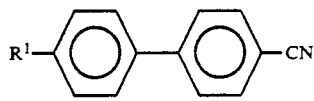

wherein $R^1$ is an alkyl group having 8, 9, 10, 11 or 12 carbon atoms, and a component B comprising at least one of 4-n-alkoxycarbonyloxy-4'-cyanobiphenyl represented by the formula (2)

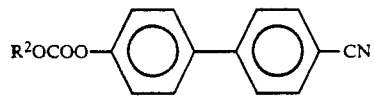

wherein $R^2$ is an alkyl group having 8, 9, 10, 11 or 12 carbon atoms, a ratio of the component A to the component B being from 25:75 to 95:5. Embodiments of the first feature of the present invention are as follows:

2) A liquid crystal composition which comprises, in addition to the components A and B, a component C comprising at least one of 4-n-alkoxy-4'-cyanobiphenyls represented by the formula (3)

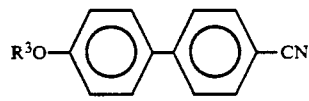

wherein $R^3$ is an alkyl group having 8, 9, 10, 11 or 12 carbon atoms, a content ratio of the component C being 35% or less.

3) A liquid crystal composition which comprises, in addition to the components A and B, a component D comprising at least one of 4-n-alkanoyloxy-4'-cyanobiphenyl represented by the formula (4)

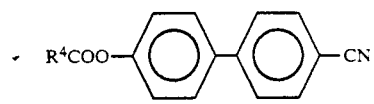

wherein $R^4$ is an alkyl group having 8, 9, 10, 11 or 12 carbon atoms, a ratio of the total of the components A and B to the component D being from 95:5 to 45:55.

4) A liquid crystal composition comprising the components A, B, C and D, a ratio of the respective components being as described above.

The preferable embodiment of the component A in the liquid crystal composition of the present invention comprises the component A (1) of at least one selected from 4-n-octyl-4'-cyanobiphenyl and 4-n-nonyl-4'-cyanobiphenyl and the component A (2) of at least one selected from 4-n-dodecyl-4'-cyanobiphenyl, 4-n-undecyl-4'-cyanobiphenyl and 4-n-decyl-4'-cyanobiphenyl, and a ratio of the component A (1) to the component A (2) is from 50:50 to 90:10.

The component B in the liquid crystal composition of the present invention comprises at least one of 4-n-alkoxycarbonyloxy-4'-cyanobiphenyl. Even when one kind of component B is used, there is the effect of lowering the melting point, but it is preferable to use two or more kinds thereof. A preferable embodiment of the component B comprises the component B (1) of at least one selected from 4-n-octyloxycarbonyloxy-4'-cyanobiphenyl and 4-n-nonyloxycarbonyloxy-4'-cyanobiphenyl and the component B (2) of at least one selected from 4-n-decyloxycarbonyloxy-4'-cyanobiphenyl, 4-n-undecyloxycarbonyloxy-4'-cyanobiphenyl and 4-n-dodecyloxycarbonyloxy-4'-cyanobiphenyl, and a ratio of the component B (1) to the component B (2) is from 40:60 to 95:5.

A second feature of the present invention is directed to a thermal writing liquid crystal display element containing a liquid crystal composition which contains a component A comprising at least one of 4-n-alkyl-4'-cyanobiphenyl represented by the formula (1)

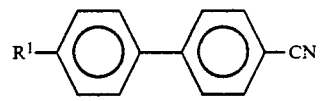

wherein $R^1$ is an alkyl group having 8, 9, 10, 11 or 12 carbon atoms, and a component B comprising at least one of 4-n-alkoxycarbonyloxy-4'-cyanobiphenyls represented by the formula (2)

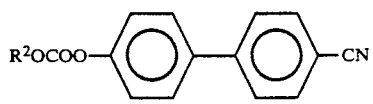

wherein $R^2$ is an alkyl group having 8, 9, 10, 11 or 12 carbon atoms, a ratio of the component A to the component B being from 25:75 to 95:5. Embodiments of the display element include thermal writing liquid crystal display elements using the above-mentioned compositions.

With regard to the liquid crystal compositions of the present invention, when each alkyl group of the compounds represented by the formulae (1), (2), (3) and (4) has a short chain length, the melting point of the composition lowers, but the nematic range thereof expands. On the other hand, when the alkyl group having a long chain length is used, the melting point of the composition heightens, but the nematic range thereof narrows or vanishes.

When the components A, B, C or D in the present invention are used singly, the composition having a nematic range of 2° C. or less and a melting point of 0° C. or less which is contemplated by the present invention cannot be obtained.

In the components A and B constituting the composition of the present invention, the content of the component B is preferably from 5 to 75%, and more preferably from 10 to 60%. When the content of the component B is less than 5% or more than 75%, effects of adjusting the nematic range and lowering the melting point are insufficient In the blend of the respective components constituting the liquid crystal composition of the present invention, even a mixture of the components A and B alone can achieve the object of the present invention, but when the component C and/or D is mixed with these components A and B, the adjustment of the nematic range and a clearing point as well as the descent of the melting point can be performed with ease.

A liquid crystal composition of the present invention can be used together with a dye, a cholesteric liquid crystal and a high-temperature liquid crystal for the adjustment of an NI point.

As the dye, there can be employed a dichroic dye in a visible region which aims at the improvement of color display or contrast, or a dichroic dye corresponding to the wave length of a laser beam, which dye is used to absorb the energy of the laser beam and thereby improve the thermal efficiency. As such a dichroic dye, a dye for a guest/host of the liquid crystal can be used. Typical examples of the dye include azo dyes, anthraquinone dyes and squalirium dyes.

The amount of the dye is 10% or less, usually 5% or less.

Typical examples of the cholesteric liquid crystal include 4'-cyano-4-(2-methylbutyloxy)biphenyl, 4'-cyano-4-(2-methylbutyl)biphenyl, 4'-(2-methylbutyloxy)benzoic acid-4'-cyanophenyl ether, 2-chloro-1,4-bis(4-2-methylbutyloxybenzoyloxy)benzene and 4'-(2-methylbutyl)-4-biphenylcarboxylic acid-4'-pentylcyclohexyl ester. The amount of the cholesteric liquid crystal is 30% or less, usually 20% or less.

Typical examples of the high-temperature liquid crystal include 4-n-nonyl-4"-cyanoterphenyl, 4-n-nonyloxy-4"-cyanoterphenyl, 4-(trans-4-n-nonylcyclohexyl)-4'-cyanobiphenyl, 1-(4'-n-hexylphenyl)-2-(4'-cyano-4-biphenylyl)ethane, trans-4-n-nonylcyclohexanecarboxylic acid-4'-cyanobiphenyl ester, 1-(4-n-hexylcyclohexyl)-2-(4'-cyano-4-biphenyl)-ethane, trans-4-n-nonylbenzoic acid-4'-cyano-4-biphenylyl ester and trans-4-n-nonyloxybenzoic acid-4'-cyano-4-biphenylyl ester. The amount of the high-temperature liquid crystal is 30% or less, preferably 20% or less.

PREFERRED EMBODIMENTS TO PRACTICE THE INVENTION

Now, the present invention will be described in detail in reference to examples, but the scope of the present invention should not be limited to these examples.

EXAMPLES 1 TO 6

Liquid crystal compositions were prepared in accordance with predetermined composition ratios (% by weight) shown in Table 2, and their characteristics were then measured. The results are set forth in the same table. In Examples 2 and 5, two melting peaks come out. Even when the peak on the side of a higher temperature is considered, a melt starting point is very low, −20° C. or less. In Example 4, even a melt terminating point is as low as −39° C.

COMPARATIVE EXAMPLES 1 TO 8

Following the same procedure as in the examples, liquid crystal compositions were prepared, and their characteristics were then measured. The results are set forth in Table 3.

In Tables 2 and 3, the symbol * denotes a lower melting peak, and the symbol ** denotes a higher melting peak.

TABLE 2

| Component | Formula of Compound | Example 1 | 2 | 3 | 4 | 5 | 6 |
|---|---|---|---|---|---|---|---|
| A (1) | $C_8H_{17}$—⟨◯⟩—⟨◯⟩—CN | 34.3 | 34.3 | 32.3 | 13.6 | 10.2 | 28.8 |
| A (1) | $C_9H_{19}$—⟨◯⟩—⟨◯⟩—CN | 10.5 | 10.5 | 19.0 | 8.0 | 6.0 | 12.0 |
| A (2) | $C_{10}H_{21}$—⟨◯⟩—⟨◯⟩—CN | 10.5 | 10.5 | 19.0 | 8.0 | 6.0 | 12.0 |

TABLE 2-continued

| | | | | | | | |
|---|---|---|---|---|---|---|---|
| A (2) | C₁₂H₂₅—⟨⟩—⟨⟩—CN | 14.7 | 14.7 | 19.0 | 8.0 | 6.0 | 7.2 |
| B (1) | C₈H₁₇—OCOO—⟨⟩—⟨⟩—CN | 14.7 | | 2.5 | 29.4 | 34.3 | |
| B (1) | C₉H₁₉—OCOO—⟨⟩—⟨⟩—CN | 9.0 | 30 | 1.5 | 18.0 | 21.0 | |
| B (2) | C₁₂H₂₅—OCOO—⟨⟩—⟨⟩—CN | 6.3 | | 1.0 | 12.6 | 14.7 | 9.0 |
| C | C₈H₁₇O—⟨⟩—⟨⟩—CN | | | | | | 10.0 |
| C | C₉H₁₉O—⟨⟩—⟨⟩—CN | | | | | | |
| C | C₁₀H₂₁O—⟨⟩—⟨⟩—CN | | | 5.7 | | | |
| C | C₁₂H₂₅O—⟨⟩—⟨⟩—CN | | | | 2.4 | 1.8 | |
| D | C₈H₁₇—COO—⟨⟩—⟨⟩—CN | | | | | | |
| D | C₉H₁₉—COO—⟨⟩—⟨⟩—CN | | | | | | 15.0 |
| D | C₁₀H₂₁—COO—⟨⟩—⟨⟩—CN | | | | | | |
| D | C₁₂H₂₅—COO—⟨⟩—⟨⟩—CN | | | | | | 6.0 |

| Characteristics (°C.) | | | | | | |
|---|---|---|---|---|---|---|
| Clearing Point | 51.6 | 51.5 | 50.1 | 60.4 | 62.5 | 57.9 |
| SN Point | 50.1 | 50.1 | 49.8 | 59.3 | 61.2 | 57.2 |
| Nematic Range | 1.5 | 1.4 | 0.3 | 1.1 | 1.3 | 0.7 |
| Melt Starting Point | −46 | −31* −21** | −14 | −50 | −47* −26** | −27 |
| Melt Terminating Point | −22 | −21* −16** | −2 | −39 | −34* −19** | −18 |

TABLE 3

| Component | Formula Compound | Comparative Example | | | | | | | |
|---|---|---|---|---|---|---|---|---|---|
| | | 1 | 2 | 3 | 4 | 5 | 6 | 7 | 8 |
| A (1) | $C_8H_{17}$—◯—◯—CN | 49 | | 36.2 | 34 | 6.8 | 48 | | 34 |
| A (1) | $C_9H_{19}$—◯—◯—CN | 15 | | 21.3 | 20 | 4.0 | 20 | | 20 |
| A (2) | $C_{10}H_{21}$—◯—◯—CN | 15 | | 21.3 | 20 | 4.0 | 20 | | 20 |
| A (2) | $C_{12}H_{25}$—◯—◯—CN | 21 | | 21.3 | 20 | 4.0 | 12 | | 20 |
| B (1) | $C_8H_{17}$—OCOO—◯—◯—CN | | 49 | | | 39.2 | | | |
| B (1) | $C_9H_{19}$—OCOO—◯—◯—CN | | 30 | | | 24.0 | | | |
| B (2) | $C_{12}H_{25}$—OCOO—◯—◯—CN | | 21 | | | 16.8 | | 22.5 | |
| C | $C_8H_{17}O$—◯—◯—CN | | | | | | | 25.0 | |
| C | $C_9H_{19}O$—◯—◯—CN | | | | | | | | |
| C | $C_{10}H_{21}O$—◯—◯—CN | | | | | | | | 6 |
| C | $C_{12}H_{25}O$—◯—◯—CN | | | | | 6 | 1.2 | | |
| D | $C_8H_{17}$—COO—◯—◯—CN | | | | | | | | |
| D | $C_9H_{19}$—COO—◯—◯—CN | | | | | | | 37.5 | |

TABLE 3-continued

| D | | | | | | | | |
|---|---|---|---|---|---|---|---|---|
| $C_{10}H_{21}$—COO—〈ring〉—〈ring〉—CN  | | | | | | | | |
| D | | | | | | | | |
| $C_{12}H_{25}$—COO—〈ring〉—〈ring〉—CN  | | | | | | | 15.0 | |
| Characteristics (°C.) | | | | | | | | |
| Clearing Point | 45.9 | 69.2 | 47.2 | 49.8 | 64.9 | 45.6 | 77.7 | 49.5 |
| SN Point | 44.9 | 66.1 | 46.9 | *** | 63.1 | 44.0 | *** | 49.2 |
| Nematic Range | 1.0 | 3.1 | 0.3 | — | 1.8 | 1.6 | — | 0.3 |
| Melt Starting Point | −3 | 7 | −12* 5** | −13 | −3 | −6 | 3 | −10 |
| Melt Terminating Point | 2 | 20 | 0* 9** | −3 | 7 | 0 | 16 | 0 |

***The N phase was not present.

POSSIBILITY OF INDUSTRIAL UTILIZATION

The liquid crystal composition and the liquid crystal element of the present invention characteristically have an extremely narrow nematic phase range and a low-melting phase transition point, and therefore they are desirable for use in thermal writing liquid crystal displays.

In the liquid crystal composition of the present invention, a nematic range can be actually set to a level of 2° C. or less, and thus the writing velocity of the display element can be accelerated. In addition, the contrast on a projection screen is improved, whereby display quality can be improved remarkably. Since having a melting point of 0° C. or less, the liquid crystal composition of the present invention can be used in thermal writing type liquid crystal displays without any problems which are utilized indoors and at room temperature. In consequence, it is fair to say that the liquid crystal composition of the present invention is a practicable liquid crystal material.

We claim:

1. A liquid crystal composition which comprises at least two components A and B, said component A comprising at least one of 4-n-alkyl-4'-cyanobiphenyls represented by the formula (1)

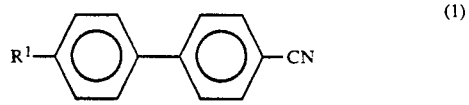

(1)

wherein $R^1$ is an alkyl group having 8, 9, 10, 11 or 12 carbon atoms,
and said component B comprising at least one of 4-n-alkoxycarbonyloxy-4'-cyanobiphenyls represented by the formula (2)

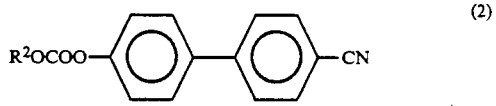

(2)

wherein $R^2$ is an alkyl group having 8, 9, 10, 11 or 12 carbon atoms,
a ratio of the component A to the component B being from 75 to 95:5.

2. A liquid crystal composition according to claim 1 which comprises, in addition to the components A and B, a component C comprising at least one of 4-n-alkoxy-4'-cyanobiphenyls represented by the formula (3)

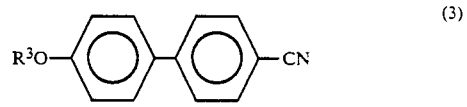

(3)

wherein $R^3$ is an alkyl group having 8, 9, 10, 11 or 12 carbon atoms,
a concentration of the component C being 35% or less.

3. A liquid crystal composition according to claim 1 which comprises, in addition to the components A and B, a component D comprising at least one of 4-n-alkanoyloxy-4'-cyanobiphenyls represented by the formula (4)

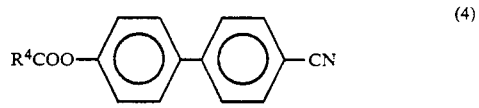

(4)

wherein $R^4$ is an alkyl group having 8, 9, 10, 11 or 12 carbon atoms,
a ratio of the total of the components A and B to the component D being from 95:5 to 45:55.

4. A liquid crystal composition according to claim 1 wherein the component A comprises a component A (1) of at least one selected from 4-n-octyl-4'-cyanobiphenyl and 4-n-nonyl-4'-cyanobiphenyl and a component A (2) of at least one selected from 4-n-dodecyl-4'-cyanobiphenyl, 4-n-undecyl-4'-cyanobiphenyl and 4-n-decyl-4'-cyanobiphenyl, and a ratio of the component A (1) to the component A (2) is from 50:50 to 90:10.

5. A liquid crystal composition according to claim 4 which comprises, in addition to the components A and B, a component D comprising at least one of 4-n-alkanoyloxy-4'-cyanobiphenyls represented by the formula (4)

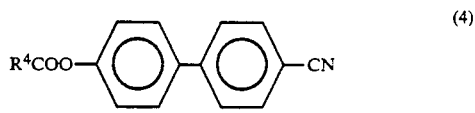

(4)

wherein $R^4$ is an alkyl group having 8, 9, 10, 11 or 12 carbon atoms, a ratio of the total of the components A and B to the component D being from 95:5 to 45:55.

6. A thermal writing liquid crystal display element containing a liquid crystal composition which contains a component A comprising at least one of 4-n-alkyl-4'-cyanobiphenyls represented by the formula (1)

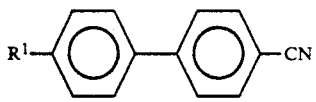 (1)

wherein $R^1$ is an alkyl group having 8, 9, 10, 11 or 12 carbon atoms, and a component B comprising at least one of 4-n-alkoxycarbonyloxy-4'-cyanobiphenyls represented by the formula (2)

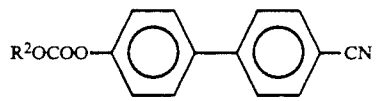 (2)

wherein $R^2$ is an alkyl group having 8, 9, 10, 11 or 12 carbon atoms, a ratio of the component A to the component B being from 25:75 to 95:5.

7. A liquid crystal composition display element according to claim 6 which contains, in addition to the components A and B, a component C comprising at least one of 4-n-alkoxy-4'-cyanobiphenyls represented by the formula (3)

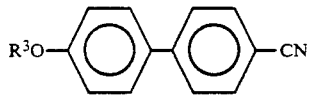 (3)

wherein $R^3$ is an alkyl group having 8, 9, 10, 11 or 12 carbon atoms, a content ratio of the component C being 35% or less.

8. A liquid crystal composition display element according to claim 6 which contains, in addition to the components A and B, a component D comprising at least one 4-n-alkanoyloxy-4'-cyanobiphenyl represented by the formula (4)

 (4)

wherein $R^4$ is an alkyl group having 8, 9, 10, 11 or 12 carbon atoms, a ratio of the total of the components A and B to the component D being from 95:5 to 45:55.

9. A liquid crystal composition display element according to claim 7 which contains, in addition to the components A and B, a component D comprising at least one 4-n-alkanoyloxy-4'-cyanobiphenyl represented by the formula (4)

 (4)

wherein $R^4$ is an alkyl group having 8, 9, 10, 11 or 12 carbon atoms, a ratio of the total of the components A and B to the component D being from 95:5 to 45:55.

10. A liquid crystal composition according to claim 2 which comprises, in addition to the components A and B, a component D comprising at least one of 4-n-alkanoyloxy-4'-cyanobiphenyls represented by the formula (4)

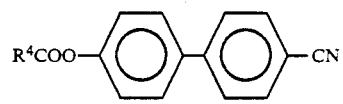 (4)

where $R^4$ is an alkyl group having 8, 9, 10, 11 or 12 carbon atoms.

a ratio of the total of the components A and B to the component D being from 95:5 to 45:55.

11. A liquid crystal composition according to claim 2 wherein the component A comprises a component A (1) of at least one selected from 4-n-octyl-4'-cyanobiphenyl and 4-n-nonyl-4'-cyanobiphenyl and a component A (2) of at least one selected from 4-n-dodecyl-4'-cyanobiphenyl, 4-n-undecyl-4'-cyanobiphenyl and 4-n-decyl-4'-cyanobiphenyl, and a ratio of the component A (1) to the component A (2) is from 50:50 to 90:10.

12. A liquid crystal composition according to claim 1 wherein said composition has a nematic range of no more than 2° C.

13. A liquid crystal composition according to claim 1 wherein said composition has a melting point no higher than 0° C.

* * * * *